(12) United States Patent
Bos

(10) Patent No.: US 9,942,038 B2
(45) Date of Patent: Apr. 10, 2018

(54) MODULAR EXPONENTIATION USING RANDOMIZED ADDITION CHAINS

(71) Applicant: NXP B.V., Eindhoven (NL)

(72) Inventor: Joppe Willem Bos, Leuven (BE)

(73) Assignee: NXP B.V., Eindhoven (NL)

( * ) Notice: Subject to any disclaimer, the term of this patent is extended or adjusted under 35 U.S.C. 154(b) by 189 days.

(21) Appl. No.: 14/932,622

(22) Filed: Nov. 4, 2015

(65) Prior Publication Data
US 2017/0126407 A1    May 4, 2017

(51) Int. Cl.
*H04L 29/06* (2006.01)
*H04L 9/30* (2006.01)

(52) U.S. Cl.
CPC ........ *H04L 9/3066* (2013.01); *H04L 2209/34* (2013.01)

(58) Field of Classification Search
CPC .................................. H04L 9/00; G06F 12/00
See application file for complete search history.

(56) References Cited

U.S. PATENT DOCUMENTS

| | | | |
|---|---|---|---|
| 6,748,410 B1 * | 6/2004 | Gressel | G06F 7/728 708/491 |
| 7,657,029 B2 | 2/2010 | Mityagin et al. | |
| 2014/0244703 A1 | 8/2014 | Luitjens et al. | |

FOREIGN PATENT DOCUMENTS

WO    03038598 A1    5/2003

OTHER PUBLICATIONS

Rivain, M., "Securing RSA against Fault Analysis by Double Addition Chain Exponentiation", Lecture Notes in Computer Science; Springer International Publishing, pp. 459-480, Apr. 2009.
Sauerbrey, J., "Resource Requirements for the Application of Addition Chains in Modulo Exponentiation", Advances in Cryptology, Eurocrypt 92, Springer Berlin Heidelberg, Berlin, Heidelberg, pp. 174-182, May 1992.
Knuth, D., "The Art of Computer Programming, Evaluation of Powers", vol. 2, Section 4.6.3, pp. 441-466, Jan. 1998.
Billet, et al., Cryptoanalysis of a white box AES implementation, Selected Areas in Cryptography—SAC 2004 (Helena Handschuh and M. Anwar Hasan, eds.), Lecture Notes in Computer Science, vol. 3357, Springer 2004, pp. 227-240.
Brauer, On addition chains Bulletin of the American Mathematical Society, vol. 45 (1939), 736.739.

(Continued)

*Primary Examiner* — Joseph P Hirl
*Assistant Examiner* — Leynna Truvan

(57) ABSTRACT

Various embodiments relate to a device for generating code which implements modular exponentiation, the device including: a memory used to store a lookup table; and a processor in communication with the memory, the processor configured to: receive information for a generated randomized addition chain; output code for implementing the modular exponentiation which loads elements from the lookup table including intermediate results which utilize the information for a generated randomized addition chain; and output code for implementing the modular exponentiation which uses the loaded elements to compute the next element.

18 Claims, 4 Drawing Sheets

(56) References Cited

OTHER PUBLICATIONS

Chow, A white-box DES implementation for DRM applications, Digital Rights Management Workshop—DRM 2002 (Joan Feigenbaum, ed.), Lecture Notes in Computer Science, vol. 2696, Springer, 2003, pp. 1-15.

Chow, et al., White-box cryptography and an AES implementation, Selected Areas in Cryptography—SAC 2002 (Kaisa Nyberg and Howard M. Heys, eds.) Lecture Notes in Computer Science, vol. 2595, Springer, 2003, pp. 250-270.

Elgamal, A public key cryptosystem and a signature scheme based on discrete logarithms IEEE Transactions on Information Theory, vol. 31 (1985) No. 4, 469-472.

Jacob, et al., Attacking an obfuscated cipher by injecting faults, Digital Rights Management Workshop—DRM 2002 (Joan Feigenbaum, ed.), Lecture Notes in Computer Science, vol. 6829, Springer, 2010, pp. 278-291.

Karroumi, Protecting white-box AES with dual ciphers, Information Security and Cryptology—ICISC 2010 (Kyung Hyune Rhee and DaeHun Nyang eds.), Lecture Notes in Computer Science, vol. 6829, Springer, 2010, pp. 278-291.

Scholz, Aufgabe 253, Jahresbericht der deutschen Mathematiker-Vereingung, vol. 47 (1937) 41-42.

Xiao, et al., A secure implementation of white-box AES, Computer Science and its Applications—CSA, 2009, pp. 1-6.

\* cited by examiner

MODULAR EXPONENTIATION USING RANDOMIZED ADDITION CHAINS

TECHNICAL FIELD

Various embodiments disclosed herein relate generally to cryptographic functions.

BACKGROUND

White-box cryptography is concerned with the design and analysis of software implementations of cryptographic algorithms engineered to execute on untrusted platforms. Particularly, this is the scenario where the user of a particular device can decrypt messages (with a secret key) which are encrypted with his public key but is unable to extract or derive sufficient information to recover this secret key. Furthermore, it is assumed that the user can be the attacker: for example, an attacker may have full access to the software implementation, can pause, alter and resume the execution of the software implementation at any time. The white-box model was first studied in the context of symmetric cryptographic algorithms such as Advanced Encryption Standard (AES) or Data Encryption Standard (DES).

Various asymmetric cryptographic schemes include modular exponentiation as the main computational operation. Modular exponentiation computes, for example, $$c = b^d \bmod N$$

where the base b, the exponent d, and the modulus N are positive integers such that $0 < b < N$ and $0 < d < \varphi(N)$. The function $\varphi$ is the Euler totient function which can be computed as $$\varphi(N) = N \prod_{p | N} \left(1 - \frac{1}{p}\right)$$

The product is over the distinct prime numbers $p > 1$ dividing N. There are two special cases used in cryptography including:
1. When N is prime then $\varphi(N) = N - 1$.
2. When $N = p \cdot q$, for two primes p and q such that $1 < p \neq q > 1$, then $\varphi(N) = (p-1)(q-1)$.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of a preferred embodiment adequate to allow those of ordinary skill in the art to make and use the inventive concepts will follow in later sections.

Various embodiments described herein relate to a device for generating code which implements modular exponentiation, the device including: a memory used to store a lookup table; and a processor in communication with the memory, the processor configured to: receive information for a generated randomized addition chain; output code for implementing the modular exponentiation based upon the generated randomized chain, which loads elements from the lookup table including intermediate results which utilize the information for a generated randomized addition chain; and output code for implementing the modular exponentiation which uses the loaded elements to compute the next element.

Various embodiments described herein relate to a method for generating code which implements modular exponentiation, the method including: receiving information for a generated randomized addition chain; outputting code for implementing the modular exponentiation based upon the generated randomized chain, which loads elements from the lookup table including intermediate results which utilize the information for a generated randomized addition chain; and outputting code for implementing the modular exponentiation which uses the loaded elements to compute the next element.

BRIEF DESCRIPTION OF THE DRAWINGS

In order to better understand various embodiments, reference is made to the accompanying drawings, wherein.

To facilitate understanding, identical reference numerals have been used to designate elements having substantially the same or similar structure or substantially the same or similar function.

DETAILED DESCRIPTION

Figure 1:
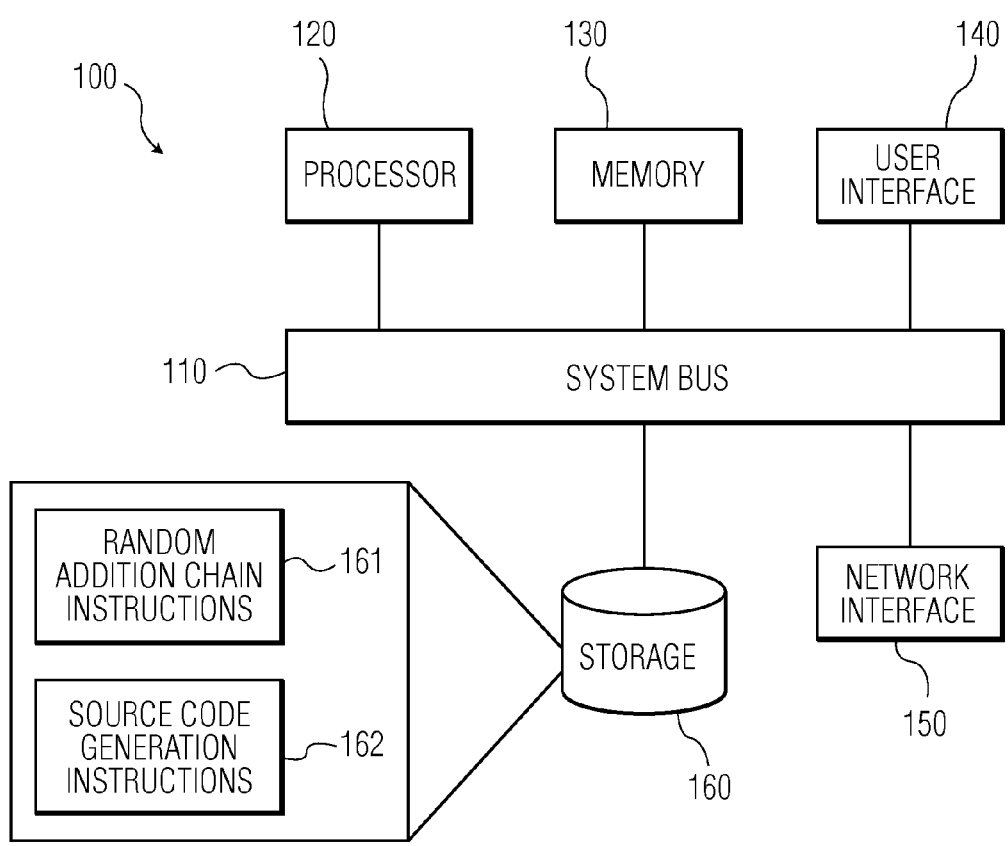
FIG. 1 illustrates an example of a hardware system 100 for implementing the asymmetric cryptographic schemes or the lookup table generation schemes.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

One method of computing modular exponentiation is based on addition chains. A finite sequence of positive integers $a_0 = 1, a_1, \ldots, a_r = s$, is called an addition chain of length r which computes s if every element a can be written as a sum $a_j + a_k$ of preceding elements.

One method to compute modular exponentiation using addition chains includes the square-and-multiply algorithm. This approach is also known as the double-and-add algorithm (when the group is written additively). The idea is based on the fact that $$x^n = \begin{cases} x(x^2)^{\frac{n-1}{2}} & \text{if } n \text{ is odd} \\ (x^2)^{\frac{n}{2}} & \text{if } n \text{ is even} \end{cases}$$

Consider an example exponent d=9997. In binary this number is $9997_{10} = 10011100001101_2$. The following addition chain based on this binary representation $$D^3 \to A \to D \to A \to D \to A \to D^5 \to A \to D \to A \to D^2 \to A$$

$$(((((2^3+2^0)\cdot 2^1+2^0)\cdot 2^1+2^0)\cdot 2^5+2^0)\cdot 2^1+2^0)\cdot 2^2+2^0 = 9997$$

computes d (where D stands for double and A for addition). When one translates this example to the modular exponentiation setting this is just what the multiply-and-add algorithm would compute. Given an input base b, the modular exponentiation $c=b^d$ mod N can be computed by replacing the doublings by squarings and the additions by multiplication $$S^3 \to M \to S \to M \to S \to M \to S^5 \to M \to S \to M \to S^2 \to M$$

$$((((((b^{\wedge}2^3 \cdot b)^2 \cdot b)^2 \cdot b)^{\wedge} 2^5 \cdot b)^2 \cdot b)^{\wedge} 2^2 \cdot b) = b^{9997} \bmod N$$

Embodiments described allow one to compute a modular exponentiation where the exponent is not directly revealed. This may be an important property when computing asymmetric cryptographic primitives in the white-box attack model.

Embodiments include a tool which on input of the secret exponent d, generates source code which implements a randomized addition chain to compute the modular exponentiation $c^d$ mod N. Techniques on how to construct such random chains efficiently and how to automatically generate them are included. The exponent d itself is not embedded directly in this source code. Even when using the same exponent multiple times, new implementations will be generated (with possibly different countermeasures to protect the code itself). These implementations provide a first step in making software implementations secure in the white-box attack model which need to compute modular exponentiations.

FIG. 1 illustrates an example of a hardware system 100 for implementing the asymmetric cryptographic schemes or the lookup table generation schemes described herein. The hardware system 100 may correspond to virtually any device that may participate in a digital signature scheme such as, for example, a personal computer, laptop, tablet, mobile communications device, server, blade, smart card, near field communication (NFC) device, or other device. For example, the hardware system may correspond to a set-top box for receiving and rendering digital content or a server for providing digital content. Various applications of the method described herein will be apparent such as, for example, digital rights management (DRM), banking applications, and generally protecting cryptographic keys in devices such as mobile phones and television set-top boxes.

As shown, the device 100 includes a processor 120, memory 130, user interface 140, network interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in the memory 130 or the storage 150. As such, the processor may include a microprocessor, field programmable gate array (FPGA), application-specific integrated circuit (ASIC), or other similar devices.

The memory 130 may include various memories such as, for example L1, L2, or L3 cache or system memory. As such, the memory 130 may include static random access memory (SRAM), dynamic RAM (DRAM), flash memory, read only memory (ROM), or other similar memory devices.

The user interface 140 may include one or more devices for enabling communication with a user such as an administrator. For example, the user interface 140 may include a display, a mouse, and a keyboard for receiving user commands. In some embodiments, the user interface 140 may include a command line interface or graphical user interface that may be presented to a remote terminal via the network interface 150.

The network interface 150 may include one or more devices for enabling communication with other hardware devices. For example, the network interface 150 may include a network interface card (NIC) configured to communicate according to the Ethernet protocol. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate.

For example, where the hardware device 100 implements a device using white-box asymmetric cryptography based on modular exponentiation, the storage 160 may include random addition chain instructions 161. Similarly hardware device 100 may implement source code generation instructions 162.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

While the hardware device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. In other embodiments, such as those embodiments wherein the device 100 is implemented in a cloud computing environment, the various components may be physically located in diverse machines. For example, the processor 120 may include a first microprocessor in a first data center server and a second microprocessor in a second data center server. Various additional arrangements will be apparent.

Figure 2:
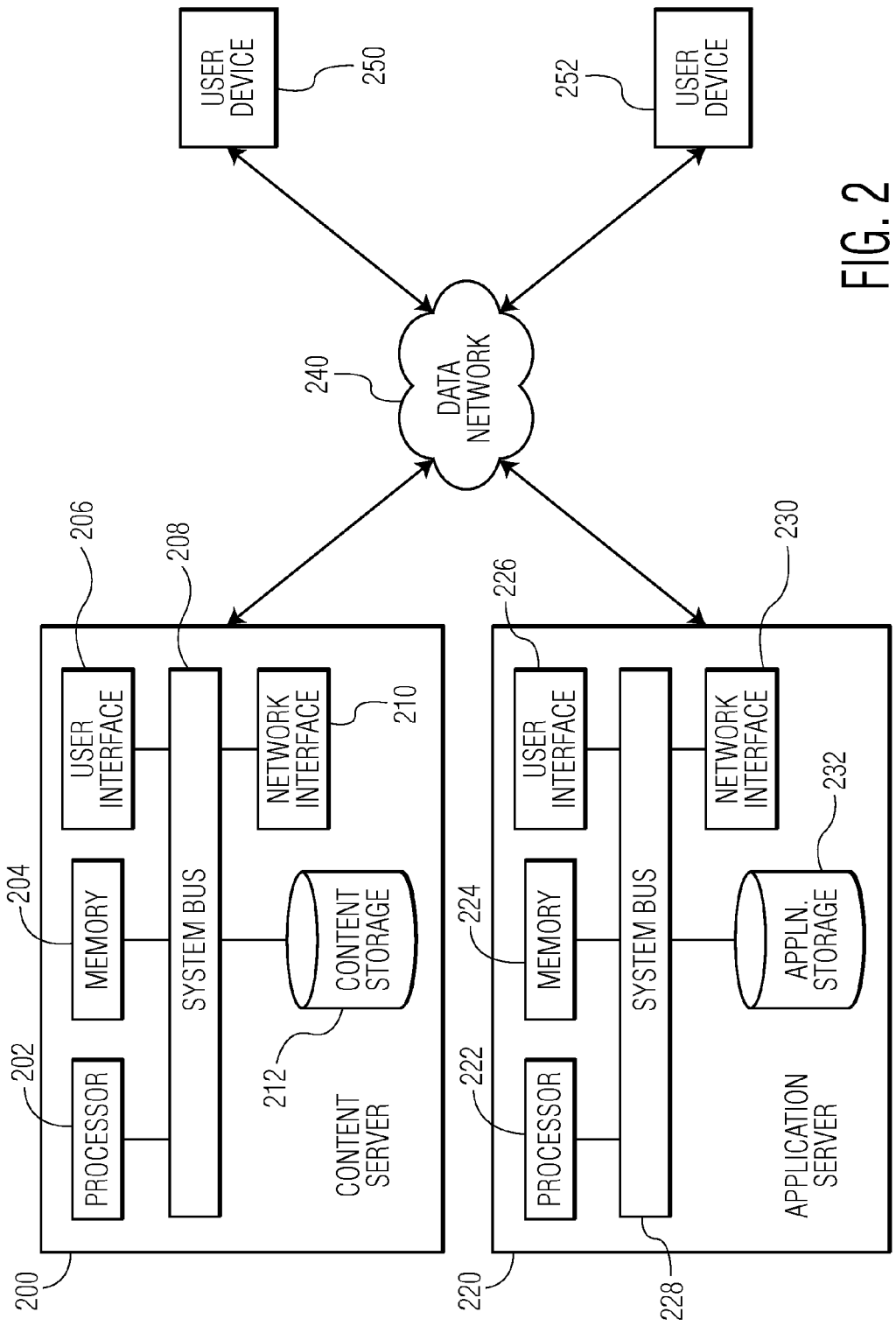
FIG. 2 illustrates an example of a system for providing a user device secure content and a software application that processes the secure content.

FIG. 2 illustrates an example of a system for providing a user device secure content and a software application that processes the secure content. The system includes a content server 200, application server 220, user devices 250, 252, and a data network 240. The user devices 250, 252 may request access to secure content provided by the content server 200 via data network 240. The data network can be any data network providing connectivity between the user devices 250, 252 and the content server 200 and application server 220. The user devices 250, 252 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 200. The software application may be downloaded from the application server 220. The software application may be obscured using the techniques described above as well as operate as described above. Once the user devices 250, 252 install the software application, the user device may then download secure content from the content server 200 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 200 may control the access to the secure content provided to the user devices 250, 252. As a result when the content server 200 receives a request for secure content, the content server 200 may transmit the secure content to the requesting user device. Likewise, the application server 220 may control access to the software application provided to the user devices 250, 252. As a result when the content server 220 receives a request for the software application, the application server 220 may transmit the software application to the requesting user device. A user device requesting the software application or secure content may also be authenticated by the respective servers, before providing the software application or secure content to the user device.

The content server 200 may include a processor 202, memory 204, user interface 206, network interface 210, and content storage 212 interconnected via one or more system buses 208. It will be understood that FIG. 2 constitutes, in some respects, an abstraction and that the actual organization of the components of the device 200 may be more complex than illustrated.

The processor 202 may be any hardware device capable of executing instructions stored in memory 204 or storage 212. As such, the processor may include a microprocessor, field programmable gate array (FPGA), application-specific integrated circuit (ASIC), or other similar devices.

The memory 204 may include various memories such as, for example L1, L2, or L3 cache or system memory. As such, the memory 204 may include static random access memory (SRAM), dynamic RAM (DRAM), flash memory, read only memory (ROM), or other similar memory devices.

The user interface 206 may include one or more devices for enabling communication with a user such as an administrator. For example, the user interface 206 may include a display, a mouse, and a keyboard for receiving user commands.

The network interface 210 may include one or more devices for enabling communication with other hardware devices. For example, the network interface 210 may include a network interface card (NIC) configured to communicate according to the Ethernet protocol. Additionally, the network interface 210 may implement a TCP/IP stack for communication according to the TCP/IP protocols. Various alternative or additional hardware or configurations for the network interface 210 will be apparent.

The content storage 212 may include one or more machine-readable content storage media such as read-only memory (ROM), random-access memory (RAM), magnetic disk storage media, optical storage media, flash-memory devices, or similar storage media. In various embodiments, the content storage 212 may store content to be provided to users.

The application server 220 includes elements like those in the content server 200 and the description of the like elements in the content server 200 apply to the application server 220. Also, the content storage 212 is replaced by application storage 232. Further, it is noted that the content server and applications server may be implemented on a single server. Also, such servers may be implemented on distributed computer systems as well as on cloud computer systems.

As will be understood, the modular exponentiation, encryption, or digital signature methods described herein may be deployed and utilized within the system of FIG. 2 or similar systems in various manners. For example, the user devices 250, 252 may be provided by a manufacturer or other seller preconfigured to transmit signed messages to the content server 200 to request the provision of content. Alternatively, the user devices 250, 252 may not be fully preconfigured for such operation; instead, the application server 220 may communicate with the user devices 250, 252 to effect such configuration. For example, the application server may transmit code instructions for implementing the methods described herein or data defining one or more lookup tables.

Figure 3:
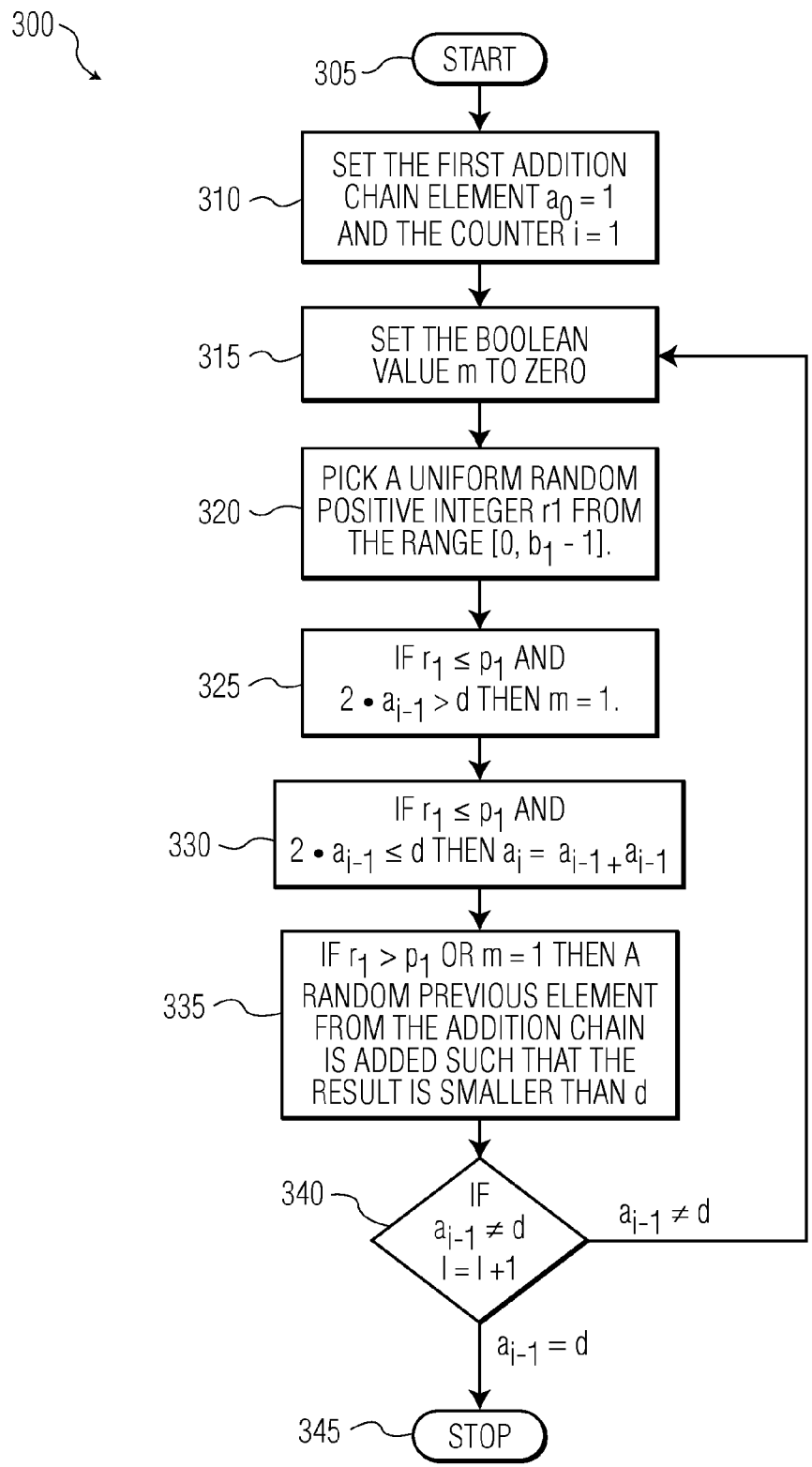
FIG. 3 illustrates an example of a method for generating a random addition chain.

FIG. 3 illustrates an example of a method for generating a random addition chain 300.

One embodiment may include a subset of all addition chains, the so-called star addition chain, but the presented techniques may apply in more generality to all addition chains. A Brauer chain or star addition chain is an addition chain in which one of the summands is always the previous element of the chain:

$$\forall k>0: a_k = a_{k-1} + a_j \text{ for some } j<k.$$

The exponent d and the integer parameters ($p_1$, $b_1$, $b_2$), such that $p_1 \leq b_1$ and $b_2$ is larger than the expected length of the addition chain, may be used to construct the random addition chain using the following steps. The method for generating a random addition chain 300 may begin in step 305.

Method for generating a random addition chain 300 may proceed to step 310. The method may initially set the first addition chain element $a_0=1$ and the counter $i=1$ in step 310.

Method for generating a random addition chain 300 may proceed to step 315. The method may set the boolean value m to zero to mark that there is no overflow in step 315.

Method for generating a random addition chain 300 may proceed to step 320 where the method may pick a uniform random positive integer $r_1$ from the range $[0, b_1-1]$.

Method for generating a random addition chain 300 may proceed to step 325 where the method may assign m=1, If $r_1 \leq p_1$ and $2 \cdot a_{i-1} \geq d$.

Method for generating a random addition chain 300 may proceed to step 330 where the method may assign $a_i = a_{i-1} + a_{i-1}$ if $r_1 \leq p_1$ and $2 \cdot a_{i-1} \leq d$.

The method for generating a random addition chain 300 may proceed to step 335. If $r_1 > p_1$ or m=1, then a random previous element from the addition chain is added such that the result is smaller than d. This may be done as follows, first one may pick a uniform random positive integer $r_2$ from the range $[0, b_2-1]$. Check if $a_{i-1} + a_j \leq d$ where the index $j = r_2$ mod i. If so, one may set $a_i = a_{i-1} + a_j$ and continue. If not, and hence $a_{i-1} + a_j > d$, one may pick another previous element from the addition chain. This may be done by picking another random element or decreasing the index j by one until one may have found an addition chain element $a_j$ such that $a_i = a_{i-1} + a_j \leq d$.

The method for generating a random addition chain 300 may proceed to step 340. The method may increase the length of the addition chain by one (i=i+1) and the method may proceed back to step 310 when $a_{i-1} \neq d$. Otherwise, the method may proceed to step 345 where it may stop.

A star addition chain has been obtained, as $a_0=1$, $a_1, \ldots, a_{i-2}, a_{i-1}=d$ of length $r=i-1$ which computes the exponent d. This chain may be computed using i−1 additions, and the required storage depends on the selection of the parameters ($p_1, b_1, b_2$) and the uniform random values used in the steps described above. For instance, computing doubling steps $a_i = a_{i-1} + a_{i-1}$ do not require additional storage while when a previous element $a_j$ with $j<i-1$ is to be used in the addition this value needs to be stored for re-usage later.

Figure 4:
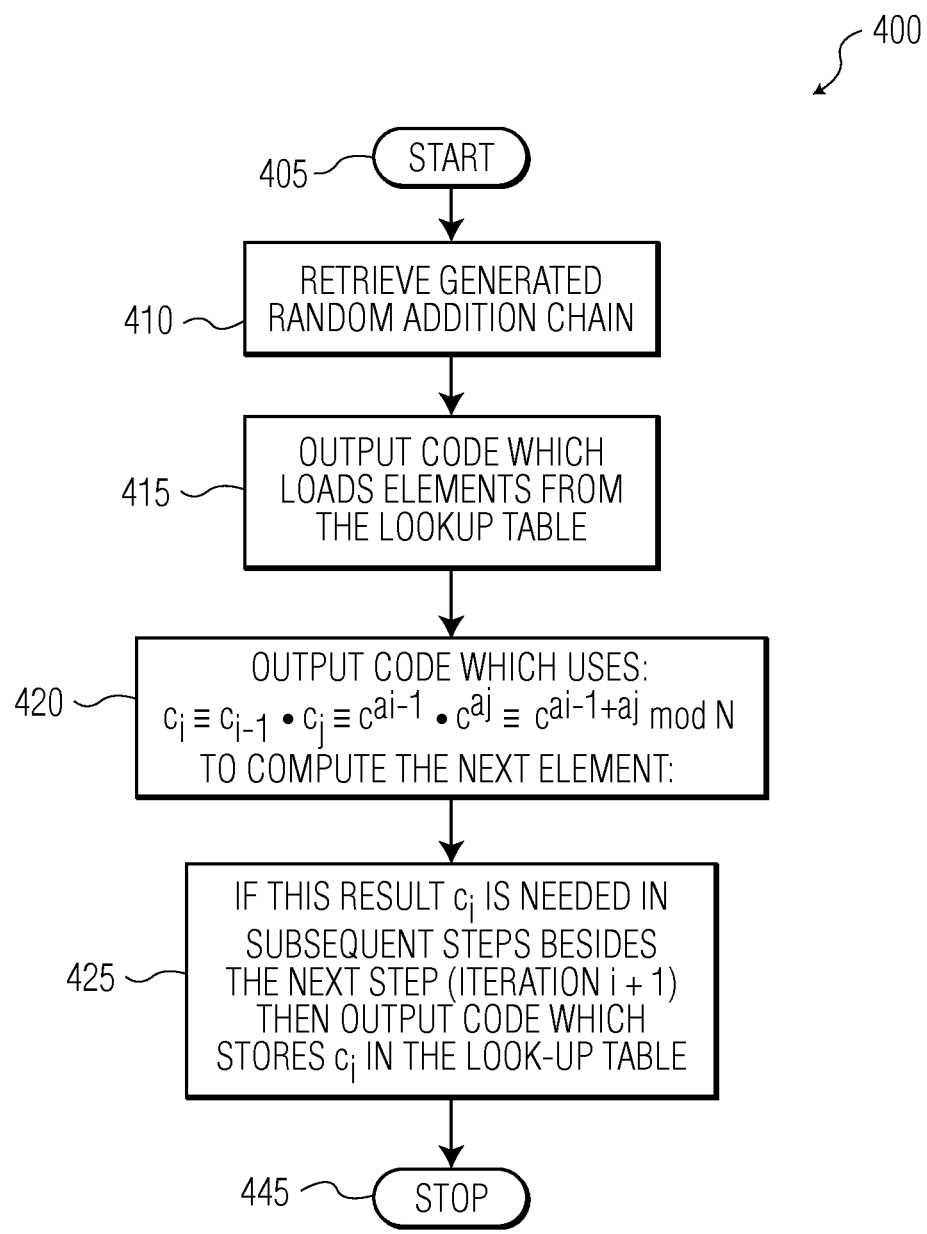
FIG. 4 illustrates an example of a method for generating source code.

FIG. 4 illustrates an example of a method for generating source code 400.

When the random star addition chain has been generated one can output the source code which computes the desired modular multiplication $c^d$ mod N. The implementation to be generated may assume it receives some value c as input (whereas the value d is fixed and secret and the modulus N is fixed and public). This means that the code generator outputs code which sets the first value in the modular exponentiation $c_0$ to the input value raised to the first element in the addition chain ($a_0=1$): $c_0 \equiv c \equiv c^{a_0}$ mod N. The implementation uses temporary memory, which may be a look-up table, to store the intermediate results which are re-used when computing the modular exponentiation. The size of the look-up table depends on the properties of the generated random star addition chain. For each step in the addition chain one may do the following (starting at i=1 until we reach the final element r)

The method for generating source code 400 may begin in step 405 and proceed to step 410. In step 420 the method may retrieve the information from the method for generating a random addition chain 300, which allows one to deduce that $a_i = a_{i-1} + a_j$, where $0 \leq j < i$.

The method for generating source code 400 may then proceed to step 415. In step 420 the method may output code which loads the elements $C_{i-1} = C^{a_{i-1}}$ mod N and $C_j = C^{a_j}$ mod N from the look-up table kept by the implementation.

The method for generating source code 400 may then proceed to step 420. In step 420 the method may output code which uses these elements to compute the next element:

$$C_i = C_{i-1} \cdot C_j \equiv C^{a_{i-1}} \cdot C^{a_j} \equiv C^{a_{i-1}+a_j} \bmod N.$$

Method for generating source code 400 may then proceed to step 425. In step 425, when this result $c_i$ is needed in subsequent steps besides the next step (iteration i+1) then the method may output code which stores $c_i$ in the look-up table.

In practice, step 420 does not need to be explicitly load the element $c_{i-1} = c^{a_{i-1}}$ mod N since it was computed in the previous step and therefore is most likely still in local registers/variables.

Various countermeasures to attackers may be added. For instance, in order to make it more difficult for a white-box attacker to follow exactly what the implementation is doing, the loading of the elements from the look-up table in step 420 may be computed differently. Instead of hard-coding the two indices i−1 and j one may use two functions $f_i^1$ and $f_i^2$ specific to iteration i, which use two hard-coded values $\alpha_i$ and $\beta_i$. The functionality of function $f_i^1$ and $f_i^2$ should be such that it is harder to distinguish what it is exactly computing and what is other (functional) code. These functions may be chosen such that $f_i^1(\alpha_i)=i-1$ and $f_i^2(\beta_i)=j$ (and return pseudo-random values for all other inputs), in the case that the second operand is not needed (i.e. when computing the modular squaring) this could, for instance, be indicated by a negative outcome of $f_i^2$. Similarly, the location where to store the result (if needed) in step 425 can be the result from (another) function $f_i^3(\gamma_i)$.

Embodiments may allow one to instantiate white-box asymmetric cryptography based on modular exponentiation. There includes widespread application ranging from digital right management (DRM), through banking applications, as well as protecting cryptographic keys in mobile phones, television set top boxes etcetera.

The tool which generates this source code consists of two parts. The first part, which constructs a random addition chain for the exponent d and the second part which, given this addition chain, generates the source code (with potentially countermeasures against attackers) built-in. The third party, who is allowed to know the secret exponent d, generates source code which implements exponentiation modulo N using a random addition chain. The parameters of this generator may be adjusted and present a trade-off between speed, code size and the number of random implementations which can be generated.

It should be apparent from the foregoing description that various embodiments of the invention may be implemented in hardware. Furthermore, various embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various embodiments have been described in detail with particular reference to certain aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A device for generating code which implements modular exponentiation, the device comprising:
   a memory used to store a lookup table; and
   a processor in communication with the memory, the processor configured to:

receive information for a generated randomized addition chain;

output code for implementing the modular exponentiation based upon the generated randomized chain, which loads elements from the lookup table including intermediate results which utilize the information for a generated randomized addition chain; and output code for implementing the modular exponentiation which uses the loaded elements to compute the next element;

wherein the receiving enables a determination such that $a_i = a_{i-1} + a_j$, where $0 \leq j < i$, wherein all $a_n$ are elements of the randomized addition chain.

2. The device of claim 1, wherein the processor is further configured to:

output code which loads the elements $c_{i-1} \equiv c^{a_{i-1}} \bmod N$ and $c_j \equiv c^{a_j} \bmod N$ from the lookup table, wherein the output source code computes the modular exponentiation according to $c^d \bmod N$ where elements $a_n$ of the randomized addition chain are input into the modular exponentiation, the value c is received as input, the value d is fixed and secret, the modulus N is fixed and public.

3. The device of claim 1, wherein the processor is further configured to:

output code to compute the next element such that:
$c_i \equiv c_{i-1} \cdot c_j \equiv c^{a_{i-1}} \cdot c^{a_j} \equiv c^{a_{i-1}+a_j} \bmod N$, wherein the output source code computes the modular exponentiation according to $c^d \bmod N$ where elements $a_n$ of the randomized addition chain are input into the modular exponentiation, the value c is received as input, the value d is fixed and secret, the modulus N is fixed and public.

4. The device of claim 1, wherein the processor is further configured to:

output code which stores $c_i$ in the look-up table if this result $c_i$ is needed in subsequent steps besides the next step (iteration i+1).

5. The device of claim 1, wherein the randomized addition chain is further generated by:

initializing the first addition chain element $a_0 = 1$ and the counter i=1.

6. The device of claim 5, wherein the randomized addition chain is further generated by:

setting the boolean value m to zero to mark that there is no overflow.

7. The device of claim 6, wherein the randomized addition chain is further generated by:

picking a uniform random positive integer $r_1$ from the range $[0, b_1-1]$;

where exponent d and the integer parameters $(p_1, b_1, b_2)$ are input, such that $p_1 \leq b_1$ and $b_2$ is larger than the expected length of the addition chain, may be used to construct the random addition chain.

8. The device of claim 7, wherein the randomized addition chain is further generated by:

assigning m=1, if $r_1 \leq p_1$ and $2 \cdot a_{i-1} > d$.

9. The device of claim 8, wherein the randomized addition chain is further generated by:

assigning $a_i = a_{i-1} + a_{i-1}$ if $r_1 \leq p_1$ and $2 \cdot a_{i-1} \leq d$.

10. A method for generating code which implements modular exponentiation, the method comprising:

receiving information for a generated randomized addition chain;

outputting code for implementing the modular exponentiation based upon the generated randomized chain, which loads elements from the lookup table including intermediate results which utilize the information for a generated randomized addition chain; and outputting code for implementing the modular exponentiation which uses the loaded elements to compute the next element;

wherein the receiving enables a determination such that $a_i = a_{i-1} + a_j$, where $0 \leq j < i$, wherein all $a_n$ are elements of the randomized addition chain.

11. The method of claim 10, wherein the method further comprises:

outputting code which loads the elements $c_{i-1} \equiv c^{a_{i-1}} \bmod N$ and $c_j \equiv c^{a_j} \bmod N$ from the lookup table, wherein the output source code computes the modular exponentiation according to $c^d \bmod N$ where elements $a_n$ of the randomized addition chain are input into the modular exponentiation, the value c is received as input, the value d is fixed and secret, the modulus N is fixed and public.

12. The method of claim 10, wherein the method further comprises:

outputting code to compute the next element such that:
$c_i \equiv c_{i-1} \cdot c_j \equiv c^{a_{i-1}} \cdot c^{a_j} \equiv c^{a_{i-1}+a_j} \bmod N$, wherein the output source code computes the modular exponentiation according to $c^d \bmod N$ where elements $a_n$ of the randomized addition chain are input into the modular exponentiation, the value c is received as input, the value d is fixed and secret, the modulus N is fixed and public.

13. The method of claim 10, wherein the method further comprises:

outputting code which stores $c_i$ in the look-up table if this result $c_i$ is needed in subsequent steps besides the next step (iteration i+1).

14. The method of claim 10, wherein the randomized addition chain is further generated by:

initializing the first addition chain element $a_0 = 1$ and the counter i=1.

15. The method of claim 14, wherein the randomized addition chain is further generated by:

setting the boolean value m to zero to mark that there is no overflow.

16. The method of claim 15, wherein the randomized addition chain is further generated by:

picking a uniform random positive integer $r_1$ from the range $[0, b_1-1]$;

where exponent d and the integer parameters $(p_1, b_1, b_2)$ are input, such that $p_1 \leq b_1$ and $b_2$ is larger than the expected length of the addition chain, may be used to construct the random addition chain.

17. The method of claim 16, wherein the randomized addition chain is further generated by:

assigning m=1, if $r_1 \leq p_1$ and $2 \cdot a_{i-1} > d$.

18. The method of claim 17, wherein the randomized addition chain is further generated by:

assigning $a_i = a_{i-1} + a_{i-1}$ if $r_1 \leq p_1$ and $2 \cdot a_{i-1} \leq d$.

\* \* \* \* \*